United States Patent [19]

de Jong et al.

[11] 4,442,474

[45] Apr. 10, 1984

[54] CAPACITIVE PRESSURE TRANSDUCER

[75] Inventors: Joannes N. M. de Jong, West Ford; Richard L. Earle, Mendon, both of Mass.

[73] Assignee: Sperry Corporation, New York, N.Y.

[21] Appl. No.: 330,527

[22] Filed: Dec. 14, 1981

[51] Int. Cl.³ ............................ H01G 5/34; G01L 9/12
[52] U.S. Cl. ....................................... 361/283; 73/724
[58] Field of Search .................. 73/724, 718; 361/283

[56] References Cited

U.S. PATENT DOCUMENTS

| | | | |
|---|---|---|---|
| 2,250,471 | 7/1941 | DeBruin | 361/283 X |
| 3,222,581 | 12/1965 | Lentant | 73/724 X |
| 3,308,357 | 3/1967 | Youngblood | 73/724 X |
| 4,091,683 | 5/1978 | Delatorre | 73/718 |
| 4,092,696 | 5/1978 | Boesen | 361/283 |
| 4,332,698 | 11/1980 | Hosterman | 361/283 X |

*Primary Examiner*—Donald A. Griffin
*Attorney, Agent, or Firm*—Howard P. Terry

[57] ABSTRACT

In a capacitive pressure transducer of the type having a flexible diaphragm, a "dimple" like or concave surface is formed therein in order to provide an air gap between the flexible diaphragm and a relatively rigid plate. When pressure is applied to the diaphragm, the diaphragm deflects providing a measurable change in capacitance which varies as a function of the applied pressure.

5 Claims, 3 Drawing Figures

CAPACITIVE PRESSURE TRANSDUCER

BACKGROUND OF THE INVENTION

1. Field of the Invention

The present invention relates to pressure transducers and more specifically to a capacitive pressure transducer of the type having a flexible diaphragm.

2. Description of the Prior Art

Rapid advances in the microelectronics art are making it feasible to employ microprocessors in digital control systems for mobile hydraulic equipment. An impediment to the commercialization of such digitally controlled hydraulic systems is the prohibitive cost of rugged and accurate sensors which are compatible with the harsh environmental conditions in which many hydraulic systems must operate.

A typical prior art capacitive pressure transducer includes a fixed metal plate and a diaphragm fabricated from a resilient metal which is mounted in front of the fixed plate inside a relatively rigid housing. The combination of the diaphragm and the fixed metal plate form the plates of a capacitor. When pressure is applied to the diaphragm, it bends closer to the fixed plate, thereby increasing the capacitance between the diaphragm and the fixed plate. When the pressure is removed or decreased, the resilience of the metal diaphragm causes it to return to its original position thereby decreasing the capacitance. The output signal of the transducer is a capacitance which varies as a function of the pressure change. The operating characteristics of the above described capacitive pressure transducer are not sufficiently reliable for use in mobile hydraulic systems subject to a harsh environment and which require considerable accuracy.

SUMMARY OF THE INVENTION

The apparatus of the present invention provides a rugged, accurate, and low cost capacitive pressure transducer. In its simplest form the capacitive pressure transducer inclues a housing, a flexible plate or diaphragm having a concave surface formed therein, and a relatively rigid plate which is disposed substantially parallel to the flexible plate such that an air gap is formed between the relatively rigid and flexible plates. Preferably, the concave or "dimple" like surface is formed in the flexible diaphragm by applying pressure to the flexible diaphragm until it deflects to a desired position and then machining the deflected flexible diphragm flat. When the flexible diaphragm returns to its original position a concave or "dimple" like surface is formed therein. In one embodiment of the present invention, the relatively rigid plate is preferably formed from an anodized aluminum disk. In another embodiment of the present invention, the relatively rigid plate is preferably formed from a grooved metallic disk and a layer of mica. When pressure is applied or removed from the flexible plate or diaphragm, the diaphragm deflects thus increasing or reducing the air gap between the substantially parallel electrodes. As the diaphragm deflects, there is a measurable change in capacitance which is a function of the pressure applied to the diaphragm.

DESCRIPTION OF THE PREFERRED EMBODIMENT

Figure 1:
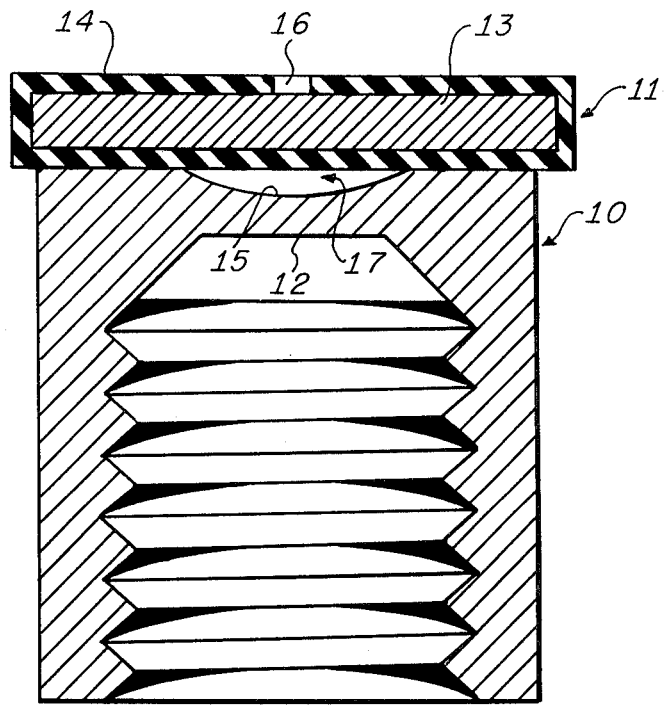
FIG. 1 is a cross sectional view of the plates utilized in the apparatus of the present invention.

Referring now to FIG. 1, a cross sectional view illustrates a flexible plate 10 and a relatively rigid plate 11 utilized in the novel capacitive pressure transducer of the present invention. Preferably, the flexible plate 10 is fabricated from a threaded cylinder of stainless steel or other corrosion resistant material which is closed at one end to form a diaphragm 12. Since the diaphragm 12 is thin relative to the circumference of the flexible plate 10, it imparts "springiness" to the flexible plate 10 when pressure is either applied or removed from the bottom of the diaphragm 12. Preferably, the relatively rigid plate 11 is fabricated from commercially procurable anodized aluminium having a core 13 of aluminum which is coated with an oxide film 14 that acts as an insulating dielectric material.

In the novel capacitive pressure transducer the relatively rigid plate 11 and the flexible plate 10 are used to form a capacitor. A positive potential may be applied to the relatively rigid plate 11 by removing a portion of the oxide coating 14 from the anodized aluminum to form a terminal 16 and by connecting a wire lead thereto. A negative or ground potential may be coupled to the flexible plate 10 by fastening the flexible plate 10 directly to a pressure port on a metallic fluidic device on which it is to operate.

The flexible plate 10 includes a "dimple" like or concave surface 15 such that there is an air gap 17 formed between the flexible plate 10 and the relatively rigid plate 11. Since air is a dielectric material, the air gap 17 acts as the dielectric. Preferably, the "dimple" like or concave surface 15 is formed during manufacture by applying pressure to the bottom of the diaphragm 12 until it deflects to a predetermined position. When the diaphragm 12 is bowed or deflected to the desired position, the diaphragm 12 is machined flat with a surface grinder. When the diaphragm 12 returns to its original position, the "dimple" like or concave surface 15 is formed therein. Consequently, when pressure is applied to the diaphragm 12, the concave surface 15 deflects upward thereby reducing the air gap between the flexible plate 10 and the relatively rigid electrode 11 and increasing the capacitance therebetween.

An extremely simple capacitive pressure transducer may be formed with the flexible plate 10 and the relatively rigid plate 11. For example, the flexible plate 10 may be threaded or fastened to a pressure port on a fluidic device, thereby using the fluidic device as a ground and as a housing for the capacitive transducer. The relatively rigid plate 11 can then be clamped or otherwise held in close contact to the flexible plate 10 by a cover. As pressure is applied to the diaphragm 12 through the pressure port, the diaphragm 12 deflects upward reducing the air gap 17 between the flexible plate 10 and the relatively rigid plate 11, increasing the capacitance of the capacitive pressutre transducer. A measurable change in capacitance may be detected at the output terminal 16 of the relatively rigid plate 11.

Figure 2:
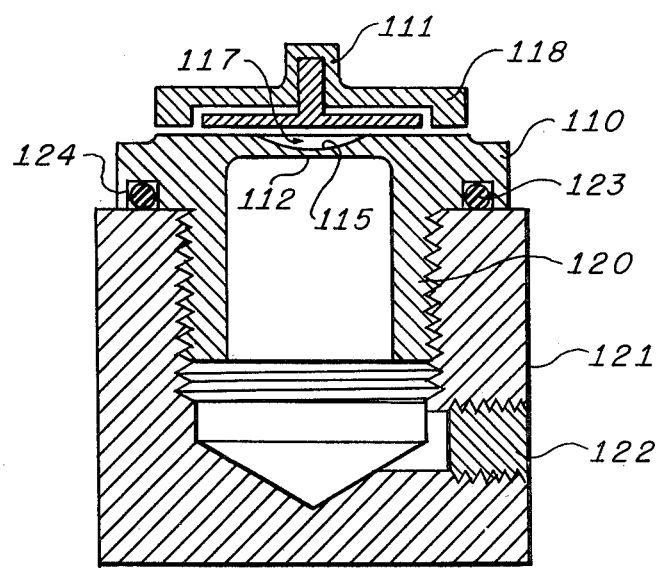
FIGS. 2 and 3 illustrate in cross sections alternate embodiments of the capacitive pressure transducer.

Referring now to FIG. 2, a cross sectional view illustrates an alternate embodiment of the present invention. The capactive pressure transducer of FIG. 2 includes a flexible plate 110 threaded into a threaded port 120 in a housing 121. The port 120 communicates with a pressure inlet 122 which enables a supply of pressurized gas or liquid to exert a pressure on a diaphragm 112. The diaphragm 112 having a "dimple" or concave surface 115, is formed in the same fashion as the above described diaphragm 12 in order to provide an air gap 117. Preferably a groove 124 is cut into diaphragm 112 and an "O" ring 123 seals the interface between the diaphragm 112 and the housing 121. A relatively rigid plate 111 which is preferably fabricated from anodized aluminum is disposed on top of the flexible plate 110 such that the air gap 117 is formed between the plates. A third plate 118 may then be disposed on top of the relatively rigid plate 111. Preferably the plate 118 is in the form of a metallic disk which abuts the oxide coating of the relatively rigid plate 111. Accordingly, it can be appreciated that the third plate 118 forms a second capacitor comprised of the plates 111, 118 and the dielectric oxide coating on plate 111. Forming a second capacitor in the aforementioned fashion is useful in providing a capacitor which is temperature insensitive and which may be used as a capacitive reference for the first capacitor comprised of the relatively rigid plate 111, the flexible plate 110 and the air gap 117.

Figure 3:
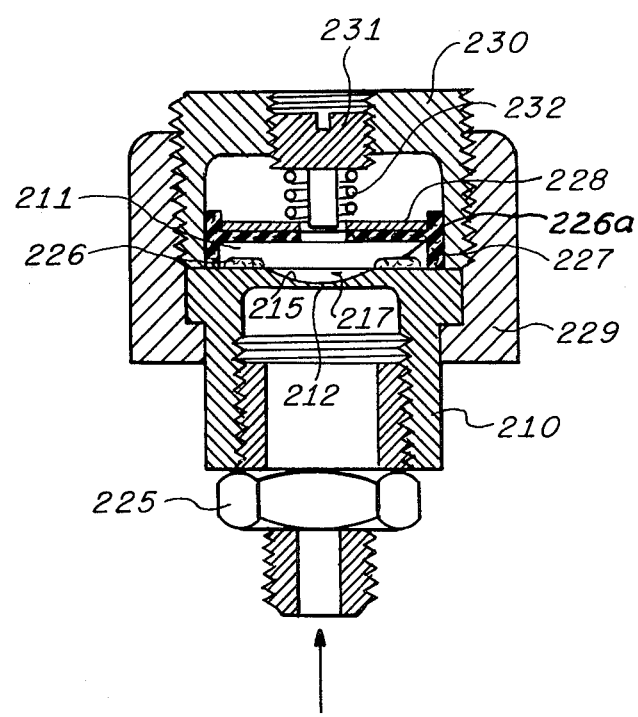

Referring now to FIG. 3, another alternative embodiment of the present invention is illustrated in cross section. The capacitive pressure transducer of FIG. 3 includes a flexible plate 210 threaded onto an adapter 225. Preferably, the flexible plate 210 is fabricated in the same fashion as the flexible plates of the above described embodiments and includes a "dimple" like or concave surface 215 in order to provide an air gap 217. The capacitive pressure transducer further includes a relatively rigid plate 211 formed from a grooved metallic disk. Within the groove 226a of the relatively rigid plate 211 is disposed a thin dielectric wafer 225 which is preferably fabricated from approximately a 0.5 mil thick piece of mica. The purpose of the groove in the relatively rigid plate 211 is to minimize noneffective parallel capacitance, and the dimensions of the groove may be selected in such a fashion as to optimize the balance between the parallel fixed capacitance of the mica dielectric and the capacitance of the dielectric air gap 217 which varies with pressure. The relatively rigid plate 211 is surrounded by an insulating material 227 in order to provide an electrical separation and lateral support. Preferably, a washer 228 is disposed on top of the insulating material 227. A nut 229 may be used to secure a threaded cover 230 over the flexible plate 210 and the relatively rigid plate 211. Preferably a screw 231 is threaded into a bore in the cover 230. The screw 231 may be used to adjust a spring 232 such that the spring tension can exert an almost constant force on the relatively rigid plate 211 and the mica wafer 226. Alternatively the cover 230 may be bolted down, thus eliminating the need for the spring 232 in reducing the vibrational sensitivity of the capacitive pressure transducer.

The capactive pressure transducer of FIG. 3, therefore, includes a single cpacitor which is comprised of the relatively rigid plate 211, the flexible plate 210 and the air gap 217. As a pressurized fluid enters through an orifice in the adapter 225, the diaphragm 212 deflects in response to the pressurized fluid. When the diaphragm deflects, the air gap 217 between the plates 210, 211 is either increased or reduced, thereby varying the capacitance between the two plates. As described above, the change in capacitance is a useful measure of the pressure changes exerted upon the diaphragm 212.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A capacitive pressure transducer comprising:
   a housing;
   a threaded cylindrical diaphragm disposed in said housing and including a flexible plate having a concave surface region therein;
   a relatively rigid plate having a groove conductive plate dielectrically separated from said flexible plate and disposed in said housing with insulation therebetween to be substantially parallel to regions of said flexible plate external to said concave surface region such that an airgap is formed between said relatively rigid plate and said concave surface region;
   adapter means threaded into said cylindrical diaphragm for directing fluid to said flexible plate;
   a cover for said housing; and
   spring-screw means mounted on said cover for exerting an adjustable force on said relatively rigid plate.

2. A capacitive pressure transducer according to claim 1 wherein said relatively rigid plate is fabricated from a conductive material coated with a dielectric material.

3. A capacitive pressure transducer according to claim 1 further includes a metallic plate disposed on said relatively rigid plate.

4. A capacitive pressure transducer according to claim 3 wherein said conductive material of said relatively rigid plate is aluminum and said dielectric material is an anodized coating of said aluminum.

5. A capactive pressure transducer according to claim 1 wherein said dielectric material consists of mica.

* * * * *